United States Patent
Mullins

(10) Patent No.: US 8,365,303 B2
(45) Date of Patent: *Jan. 29, 2013

(54) AUTHORIZING USE OF A COMPUTER PROGRAM

(75) Inventor: Leo Joseph Mullins, Currambine (AU)

(73) Assignee: Optimiser Pty Ltd., Osborne Park (AU)

( * ) Notice: Subject to any disclaimer, the term of this patent is extended or adjusted under 35 U.S.C. 154(b) by 51 days.

This patent is subject to a terminal disclaimer.

(21) Appl. No.: 12/730,679

(22) Filed: Mar. 24, 2010

(65) Prior Publication Data

US 2010/0275268 A1 Oct. 28, 2010

Related U.S. Application Data

(63) Continuation of application No. 10/240,207, filed as application No. PCT/AU01/00350 on Mar. 28, 2001, now Pat. No. 7,694,345.

(30) Foreign Application Priority Data

Mar. 28, 2001 (AU) ........................ PQ6544

(51) Int. Cl.
G06F 7/04 (2006.01)
(52) U.S. Cl. .............. 726/28; 726/27; 726/31; 713/150; 713/182

(58) Field of Classification Search .................. None
See application file for complete search history.

(56) References Cited

U.S. PATENT DOCUMENTS

| 5,138,712 | A | | 8/1992 | Corbin |
|---|---|---|---|---|
| 5,204,897 | A | | 4/1993 | Wyman |
| 5,295,244 | A | | 3/1994 | Dev et al. |
| 5,343,527 | A | | 8/1994 | Moore |
| 5,553,143 | A | | 9/1996 | Ross et al. |
| 5,590,266 | A | | 12/1996 | Carson et al. |
| 5,671,412 | A | | 9/1997 | Christiano |
| 5,745,879 | A | | 4/1998 | Wyman |
| 5,758,068 | A | | 5/1998 | Brandt et al. |
| 5,758,069 | A | | 5/1998 | Olsen |
| 5,825,883 | A | | 10/1998 | Archibald et al. |
| 6,023,766 | A | | 2/2000 | Yamamura |
| 6,119,109 | A | * | 9/2000 | Muratani et al. .............. 705/400 |
| 6,948,122 | B2 | | 9/2005 | Matsumoto |

* cited by examiner

Primary Examiner — Pramila Parthasarathy
(74) Attorney, Agent, or Firm — Merchant & Gould P.C.

(57) ABSTRACT

A method of authorising use of a computer program only able to be used when an authorised message is received from an authorising system includes providing an authorisation system, making a request to use a computer program, signalling the request to the authorisation system, the authorisation system recording the use of the computer program and providing the authorisation message to the computer program upon receipt of the authorisation message the computer program may be used.

122 Claims, 5 Drawing Sheets

AUTHORIZING USE OF A COMPUTER PROGRAM

This application is a Continuation Application of 10/,240,207, filed Apr. 23, 2003 in the United States, which is a National Stage Application of PCT/AU2001/00350, filed Mar. 28, 2001, which claims benefit of Serial No. PQ 6544, filed Mar. 28, 2000 in Australia and which applications are incorporated herein by reference. To the extent appropriate, a claim of priority is made to each of the above disclosed applications.

FIELD OF THE INVENTION

The present invention relates to authorising use of a computer program, in particular the present invention relates to a method of authorising use of a computer program, a computer configured to authorise the use of a computer program and a computer readable media on which is stored computer software for authorising use of a computer program.

BACKGROUND OF THE INVENTION

There is an increasing need for securing and protection of computer programs and other digital products. This is reflected in an increasing demand for a "pay as you use" payment arrangement for licensed use of computer software. It is known for a server to provide application software to a plurality of client's machines. Under this model it is possible to provide a "pay as you use" method of software licensing. Current pricing models used for the payment of software applications are based on per user and seat licensing agreements that are complex, restrictive and inefficient, especially for client server and application service provider software delivery. "Pay as you use" pricing is demanded by software users for its simplicity, cost effectiveness and flexibility.

There is therefore a need for an alternative method of providing a software licensing system that allows for each user of the software to correspond a payment for that use. The licensed software needs to be able to be prevented from use unless authorised, to allow for inter alia payment for using the software.

SUMMARY OF THE PRESENT INVENTION

An object of the present invention is to provide a method of authorising use of a computer program in a manner suitable for implementing inter alia a "pay as you use" licensing system.

According to the present invention there is provided a method of authorising use of a computer program, said method including the steps of:
  providing an authorisation system;
  recording an identifier of a computer program to be authorised for use with the authorisation system;
  a user registering with the authorisation system and receiving a user identification from the authorisation system;
  the user making a request to use the computer program;
  the computer program identifier and user identification being sent to the authorisation system in a login request message;
  the authorisation system verifying the identity of the user from the user login identification and checking that the user is authorised to use the computer program identified by the computer program identifier;
  the authorisation system recording the information sent with the request message;
  if the user is verified and authorised to use the computer program, then a login authorisation message is sent to the computer program, otherwise an authorisation denied message is sent to the computer program;
  whereby upon receipt of the authorisation message the computer program may be used by the user.

Preferably the method includes the steps of:
  the computer program sending a request to the authorisation system to incur a charge for the use of the computer program;
  the authorisation system recording a charge against the identified user for use of the computer program.

Preferably the authorisation system records whether the user is verified, whether the user is authorised to use the computer program and a time stamp.

Preferably the computer program may be a software application or a sub-component of a software application.

Preferably the charge for use of the computer program is recorded in usage units.

Preferably a rate of charging usage units for the use of the computer program is recorded in the authorisation system. A different rate of charge may be applied to different computer programs.

Preferably the usage units are charged by the authorisation system upon receipt of the request to charge for the use of the computer program.

Preferably the request to the authorisation system for charge of usage units is sent once per use of the computer program. Alternatively the request to the authorisation system to charge usage units is sent once per specified period during the use of the computer program.

Preferably the user purchases usage units in advance of use of the computer program, the usage unit total being reduced by each charge, use being authorised only while there are a positive number of usage units left.

Preferably the authorisation message is encrypted. Preferably, the communication between the interface program and the authorisation system is encrypted. Preferably messages to and from the authorisation system includes a unique component that is only valid for a single use, so that the message can't be duplicated and used again.

Preferably the user identification is obtained from the user by providing the user with a login prompt, the user entering the login identification provided by the authorisation system, the entered user identification being included in the login request.

Preferably an interface program signals the login request to the authorisation system. Preferably the interface program is a separate program called by the computer program being authorised as part of the initialisation of the authorised computer program. In one embodiment the interface program forms part of the computer program and is started when a user attempts to use the computer program. In another alternative embodiment, the interface program is part of an operating system and is started when a user attempts to use the computer program.

Preferably the authorisation system is at a location remote from a computer running the activated computer program. More preferably, the computer running the activated computer program also runs the interface program, the interface program communicates with the authorisation system over a computer network.

Preferably the authorisation system is configured to record and authorise a plurality of computer programs. Typically, the authorisation system is configured to record and authorise a plurality of uses of the same computer program.

In one embodiment the authorisation is provided for each activation of the computer program. Typically, a charge is generated for each use of the computer program. In another embodiment, the authorisation is required periodically, wherein at the end of a period of time specified in the computer program from the last authorisation, a request to charge the usage units is sent to the authorising system for a further authorisation, the authorisation system sends each further authorisation and records the use for each period, whereby a charge is generated for each authorisation message sent.

In yet another embodiment, when the computer program is finished, a terminate message is sent to the authorisation system, the authorisation system records the duration of the use of the computer program between when the authorisation message is sent to the computer program until the terminate message is received, whereby a charge in PUs is generated for use of the computer program corresponding to the recorded duration.

According to another aspect of the present invention there is provided a distributed system for authorising use of a computer program, said system comprising at least:

an authorisation system, with a storage means for recording an identifier of a computer program to be authorised for use with the authorisation system and recording a user identification;

a computer for running the computer program;

the computer being configured to send the identifier of the computer program and user identification to the authorisation system in a login request message when the user makes a request to use the computer program;

the authorisation system being configured to verify the identity of the user from the recorded user login identification and check that the user is authorised to use the computer program identified by the recorded computer program identifier;

the authorisation system configured to record the information sent with the request message;

the authorisation system being configured to send a login authorised message to the computer if the user is verified and authorised to use the computer program and otherwise send an authorisation denied message to the computer;

whereby the computer is configured to continue use of the computer program upon receipt of the authorisation message but otherwise terminate the use of the computer program.

Preferably the computer is configured to sending a request to the authorisation system to record a charge or the use of the computer program against the identified user for use of the computer program.

Preferably the computer storage means records the rate of charge for the use of the computer program Preferably the authorisation system records a charge against the user upon receipt of the request to charge for use of the computer program.

Preferably the computer is configured to send a request to the authorisation system to charge the user once per use of the computer program.

Preferably the computer is configured to send a request to the authorisation system to charge the user is sent once per specified period during the use of the computer program.

Preferably the computer is the communication between the computer program and the authorisation system is encrypted.

Preferably the computer and authorisation system are configured to include a unique component in the encrypted messages communicated therebetween.

Preferably the authorisation system is at a location remote from a computer running the activated computer program.

Preferably the computer running the activated computer program also runs the interface program, an interface program that communicates with the authorisation system over a computer network.

Preferably the authorisation system is configured to record and authorise a plurality of computer program.

BRIEF DESCRIPTION OF THE DRAWINGS

In order to provide a better understanding, preferred embodiments of the present invention will now be described in detail, by way of example only, with reference to the accompanying drawings, in which.

DETAILED DESCRIPTION OF PREFERRED EMBODIMENTS

Figure 1:
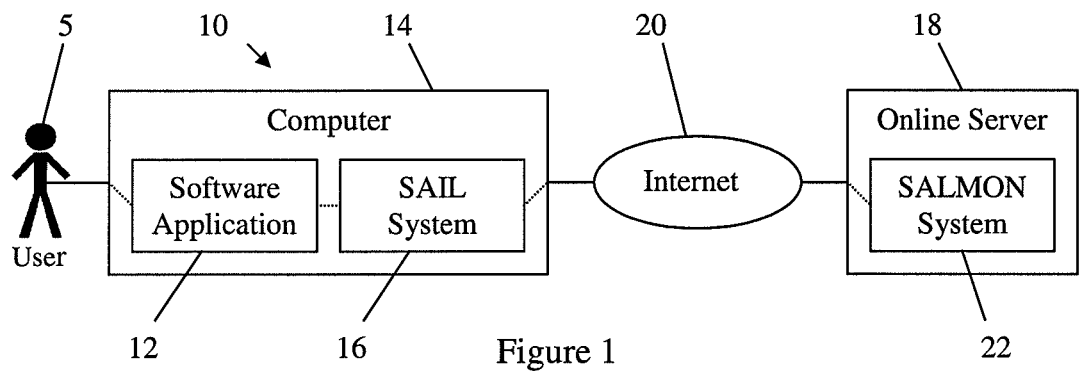
FIG. 1 is a schematic representation of a system that enables the authorisation of use of a computer program in accordance with the present invention.

Referring to FIG. 1, a system 10 is shown for authorising use of a computer program, such as a software application 12 on a computer 14. The computer program may be a sub-component of a larger software application. A user 5 activates the software application 12 for execution on the computer 14. The software application 12 calls an interface program 16, known as a Software Application Interface Library program (SAIL). The SAIL 16 communicates with an on-line server 18 via a network, such as the Internet 20. An authorisation system 22 is running on the server 18. The authorisation system 22 is called a Software Application Licence Manager Over Networks (SALMON) system. It is noted that the computer platform need not be the same as the server, likewise operating systems of the computer and the server need not be the same. The SALMON system 22 is able to handle many software applications on a plurality of computers, each having a SAIL interfacing with the SALMON system 22 via a communication network, such as the Internet 20. The SALMON system 22 communicates with the SAIL 16 to determine whether the user is authorised to use the software application 12. There is a one to one relationship between the user and the instance of the software application. This allows for each user to be charged for each use of the software application.

The SAIL 16 is provided to a software vendor that wishes to use the system 10 of the present invention. The software vendor incorporates calls to the SAIL 16 in the vendor's computer program.

The computer program or software application 12 is written to be disabled from use until the user 5 is identified to the SALMON system 22 using a login routine of the SAIL 16 and receives an authorisation message from the SALMON system 22. The authorisation message operates as a once off run time licence. The SAIL 16 sends another authorisation message to the software application 12 when it receives the authorised message from the SALMON system 22.

Specifically, when the software application is started, it calls a login sub-routine of the SAIL 16. The application waits for the SAIL login sub-routine to return a message indicating that the user is logged in. A software vendor wanting to charge for use of the software can decide the price of use. It may be free, parts of the software may be charged for, or all of the software may be charged for. The cost may be charged on each start-up of the application, on a time basis or on a per function basis. Different users may be charged different rates. A user is charged for using a program use run-time licence unit (RTL). The SAIL 16, once logged in, can send a message to the SALMON system 22 to record usage of the computer program/software application according the payment scheme desired.

Figure 3:
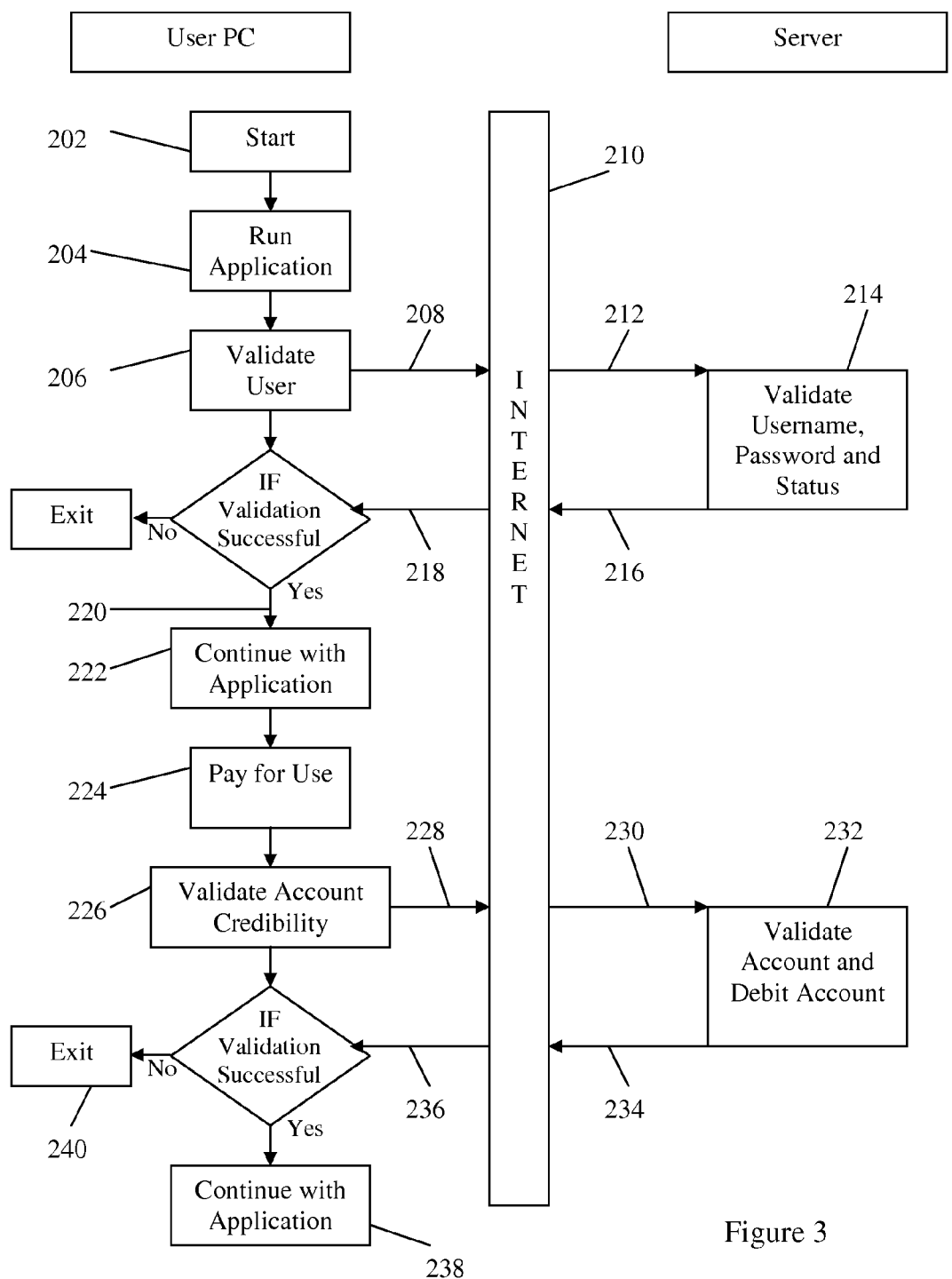
FIG. 3 is a flow chart showing the method of the present invention.

Referring to FIG. 3, which shows the operation of the present invention in the form of a flow chart. The flow chart starts at 202 where a user wishes to run a software application. The user activates the software application in the normal manner at 204. The software application interfaces with the SAIL 16 to validate the user at 206 via a login request message which is encrypted with a public key at 208 by the SAIL 16. The encrypted login request message is communicated over a network 210, such as the internet, and is then decrypted with a private key at 212 in a server running the SALMON system 22. The SALMON system 22 validates the user name, password and the status of the application at 214. If the user is valid and authorised to use the software application, a logged-in confirmation message is encrypted with a public key at 216 and sent across the network 210. It is decrypted at 218 with a private key by the SAIL 16.

If the validation is successful, as indicated by 220, the application continues at 222. If the software vendor wishes the user to pay for the use of the software application, the steps from 224 take place. The account creditability is validated at 226. The SAIL 16 sends a public key encrypted "allocate a charge" message at 228 over the network 210. The message is then decrypted with a private key at 230. The account is checked to determine whether sufficient RTLs are available. If so, the required number of RTLs are debited at 232. A charged confirmation message is encrypted with a public key and sent at 234 across the network 210 and decrypted at 236 with a private key. If the validation is successful the application continues at 238, otherwise it terminates at 240.

The method of encryption of transmitted messages involves the inclusion of a unique component so that a message is valid only once. Each message is in the form of a binary number to be sent between the SAIL 16 and the SALMON system 22. A random number is added to the message. A digestion routine takes the data from the message and the random number to produce a digestion value. The digestion value is computed in such a way that finding an input that will exactly generate a given digest is computationally infeasible. The message data, the random number and the digestion value are then encrypted using a public key. The message is then transmitted. The received message is then decrypted using a private key. The decrypted message is then separated in to individual components. The message can be validated by using the same digestion formula on the message and random number components to check the digestion result calculated against the digestion value received. If the values are the same the message is considered valid, otherwise it is considered invalid. This process provides a different data sequence for each message even if the same acknowledgment message is sent each time. In this way each message includes a unique value which can only be used once. Thus if the message is duplicated it will no longer by valid and will be rejected.

The SALMON system 22 may be configured to allow many users to be authorised at the same time for one or more software application. The software vendor may allow up to a predetermined number of users to login for a particular software application. For each authorised user allowed a login a login resource is allocated in the SALMON system 22. Each available login resource, a login daemon process will be waiting for a user to login.

Figure 2A:
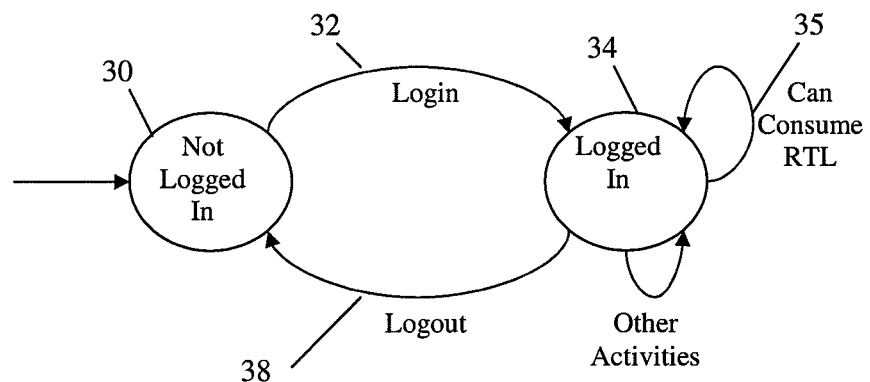
FIG. 2a is a state diagram showing the states of a server waiting for a login.

Referring to FIG. 2a, until a login is received each of the login daemon processes remains in a not logged in state 30. Once a login 32 is received the SALMON system 22 enters a logged in state 34. A routine "Can consume RTL" 35 checks to see whether RTLs may be consumed, until the user 5 logs out at 38, whereupon the login resource of the SALMON system 22 re-enters the not logged in state 30. Thus checking that sufficient funds (in the form of RTLs) are available can be a criterion for authorisation.

Figure 2B:
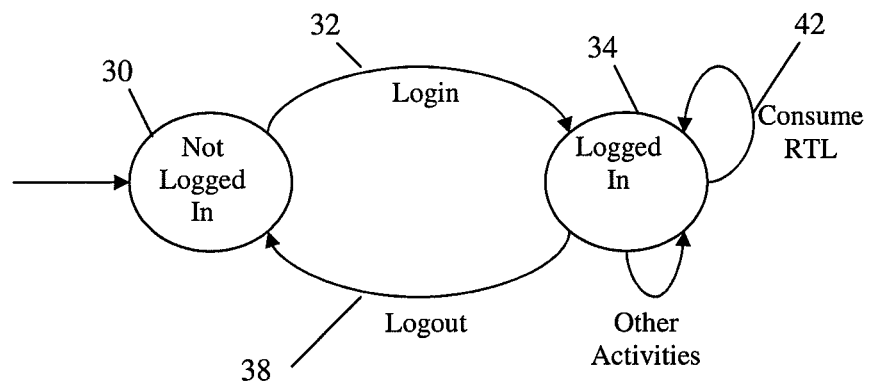
FIG. 2b is a state diagram showing the states of a run time licence consumption session.

FIG. 2b shows the consumption of RTLs in the logged in state 34. A routine "ConsumeRTL" 42 consumes RTLs on the successful verification by SALMON system 22. If there are sufficient RTLs and it is a valid transaction. At the completion of the use of software application pending logout, or once all available RTLs are consumed, the user logs out 38.

A user of the software application using the on-line pay as you use model must first be registered with the on-line SALMON system 22. They will be provided with a user name and password so that the SALMON system 22 can identify them and the login details verified.

The login of the user is to verify that the user is logged with the on-line SALMON system 22 before being able to proceed with use of the software. The software application logs out from the SALMON system 22 in order to provide a clean exit. Generally, only one login session per user should be active, a previous session must be logged out before another login session can begin.

Figure 4:
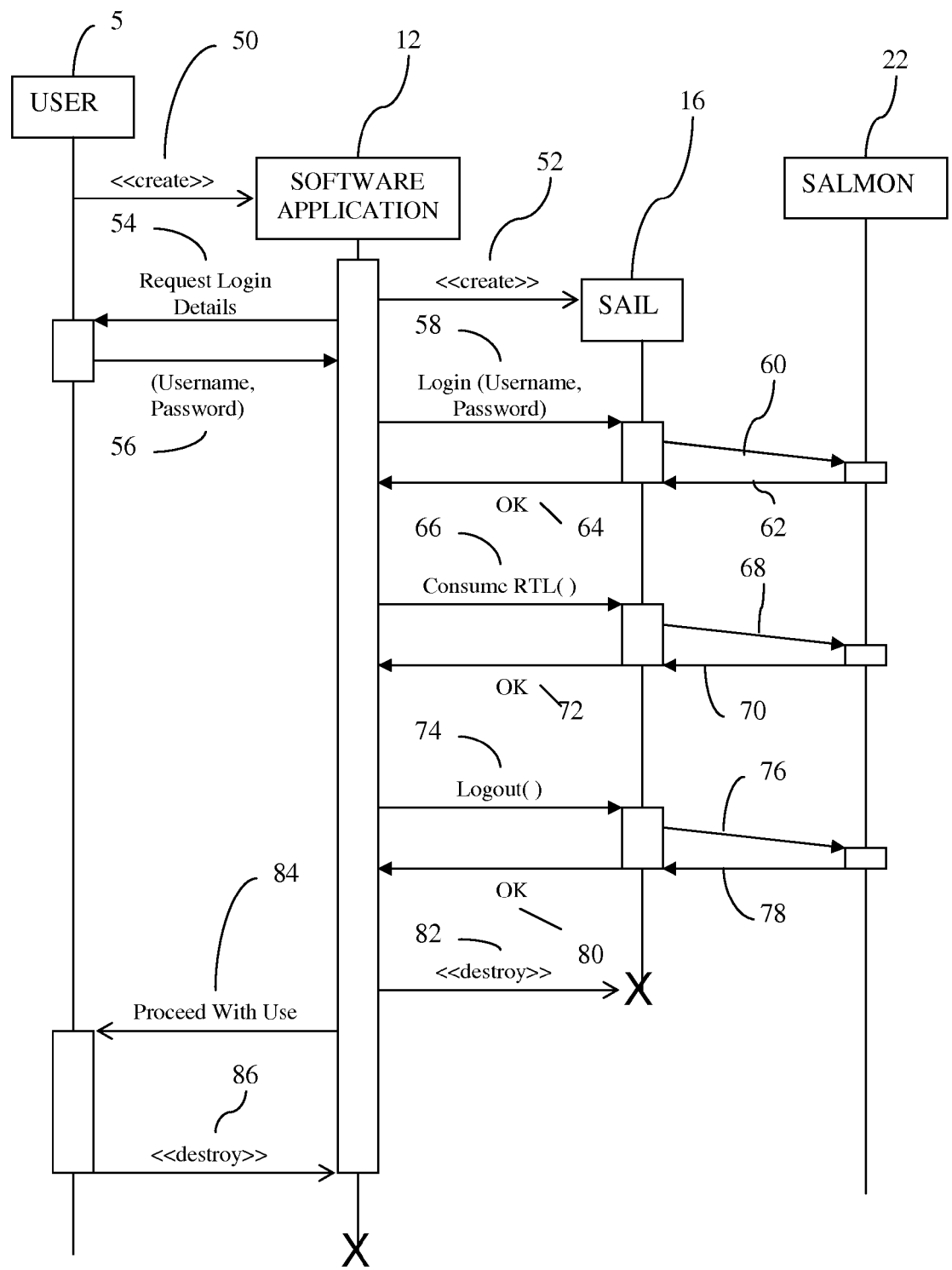
FIG. 4 is a schematic timing diagram of message passing between components of the system of FIG. 1.

Referring to FIG. 4, the passing of messages is now described. A user 5 activates a software application 12 thereby creating 50 an instance of the software application 12. The software application 12 then creates 52 an instance of the SAIL 16. The software application 12 requests details from the user 5 at 54. The user 5 enters a user name and password at 56. The software application calls a "SAIL-login" routine of the SAIL 16 at 58. The SAIL 16 then establishes a connection, via the Internet 20, to the SALMON system 22. The SAIL-login routine then passes the user name, password and an identification of the software to the SALMON system 22. Once confirming that the login details are correct, the SALMON system 22 sends a login "OK" message at 62 to the SAIL 16 which then at 64 sends an "OK" message to the software application 12.

Depending on the model that the software vendor wishes to use the charge for use of the software an appropriate scheme of using RTLs will be used. The scheme described in relation to FIG. 4 is for a one-off charge for use of the software application. Other schemes will be described below.

The software application 12 then sends a one-off request to consume an RTL at 66. This request is a SAIL-consume RTL call. The SAIL-consume RTL sends a consume RTL message to the SALMON system 22 at 68. The SALMON system 22 records the request to consume RTL and sends an authorisation message at 70 to the SAIL 16. The SAIL 16 then passes the OK message at 72 to the software application 12. The software application 12 then begins to log out of the SAIL 16 at 74. The logout message is then passed from the SAIL 16 to the SALMON system 22 at 76. A Logout confirmation message is then passed from the SALMON system 22 to the SAIL 16 at 78. The logout confirmation message is then sent from the SAIL 16 to software application 12 at 80. The software application 12 may then terminate the SAIL program 16 at 82. The user 5 may proceed with use of the software application 12 at 84. Once the user has finished with the software application 12 it may then be terminated at 86.

The recording of the consumption of a one-off consumption of an RTL creates a charge for the one-off use of the software application 12. This charge may be deducted from an amount of RTLs held in credit for the user 5 or may be billed to the user 5.

Different software applications may request the consumption of different numbers of RTLs. For example a word processing application may consume five RTLs whereas a spreadsheet may consume 10. As mentioned above, the software being authorised need only be a sub-component of a large software application. For example, a print function may be regarded as the computer program being authorised. For each use of the print function a charge is accrued. A user 5 may also be entitled to a discount such as, for example, if they are a high volume user. The number of RTLs may then be multiplied by a user discount to produce a final number of RTLs deducted from the user's account.

Figure 5:
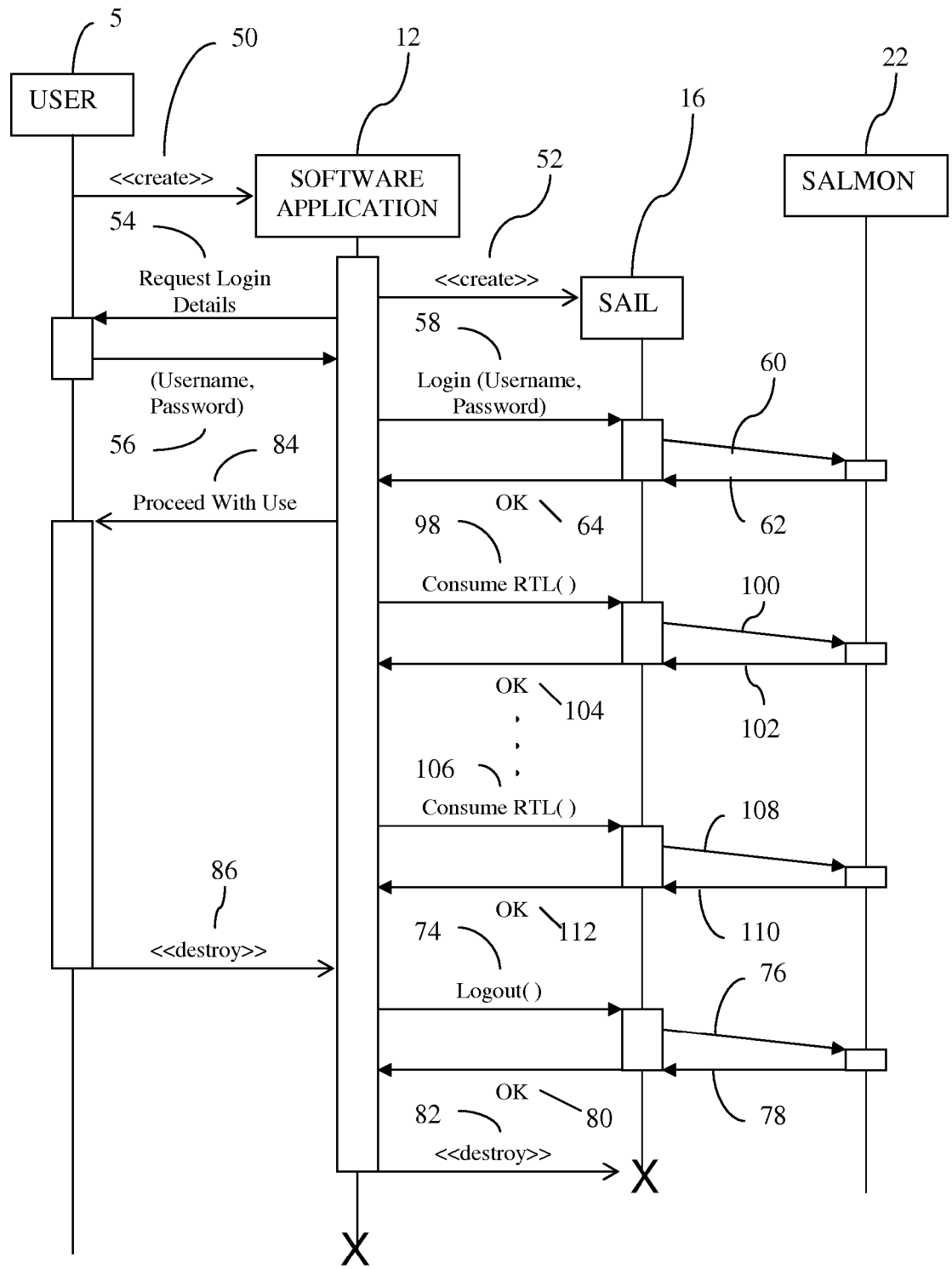
FIG. 5 is a schematic timing diagram of an alternative method of message passing between components of the system of FIG. 1.

Referring to FIG. 5, the periodic consumption of RTLs is described. Periodic consumption of RTLs may be consumed at a different rate to one-off consumption of RTLs. Like numerals depict like actions from FIG. 4. Again the user 5 starts the software application 50 which creates the instance of the SAIL 16 at 52. Login is requested at 54 and login details are provided to the SAIL 16 at 56. The login details are then passed from the software application to SAIL 16 at 58 and then onto the SALMON system 22 at 60. The confirmation of login is passed from the SALMON system 22 to the SAIL 16 at 62, and from the SAIL 16 to the software application at 64. The user may proceed with the normal use of the application at 84. In the meantime, the software application 12 makes periodic requests to the SAIL 16 for the consumption of an RTL at 98. The SAIL 16 passes the request to the SALMON system 22 at 100. The confirmation of the recording of the consumption of the RTL occurs in the SALMON system 22 and the confirmation of this is then passed from the SALMON system 22 to the SAIL 16 at 102 and then from the SAIL 16 to software application 12 at 104.

At the end of each period a further RTL is consumed as indicated by 106, 108, 110 and 112. When the user has finished with the application, a command is sent to exit from the application 12 at 86. The software application then sends the logout message to the SAIL 16 at 74 which is the sent on at 76 to the SALMON system 22. Confirmation of the logout is sent from the SALMON system 22 to the SAIL 16 at 78 and then from the SAIL 16 to the software application 12 at 80, whereupon the software application may end the instance of the SAIL 16 at 82 and then shut itself down.

As an alternative the software application 12 may specify the period to the SAIL 16 and the SAIL 16 handles the operation of sending consume RTL messages to the SALMON system 22 for deduction RTLs from the users account.

The number of periodic RTLs consumed is recorded and a corresponding charge generated. The total charge for the session is deducted from an account or billed out. RTLs may use currency units, the consumption of RTLs is in itself payment.

The charge for the consumption of each RTL can be arranged by agreement between the software vendor and the system operator.

Figure 6:
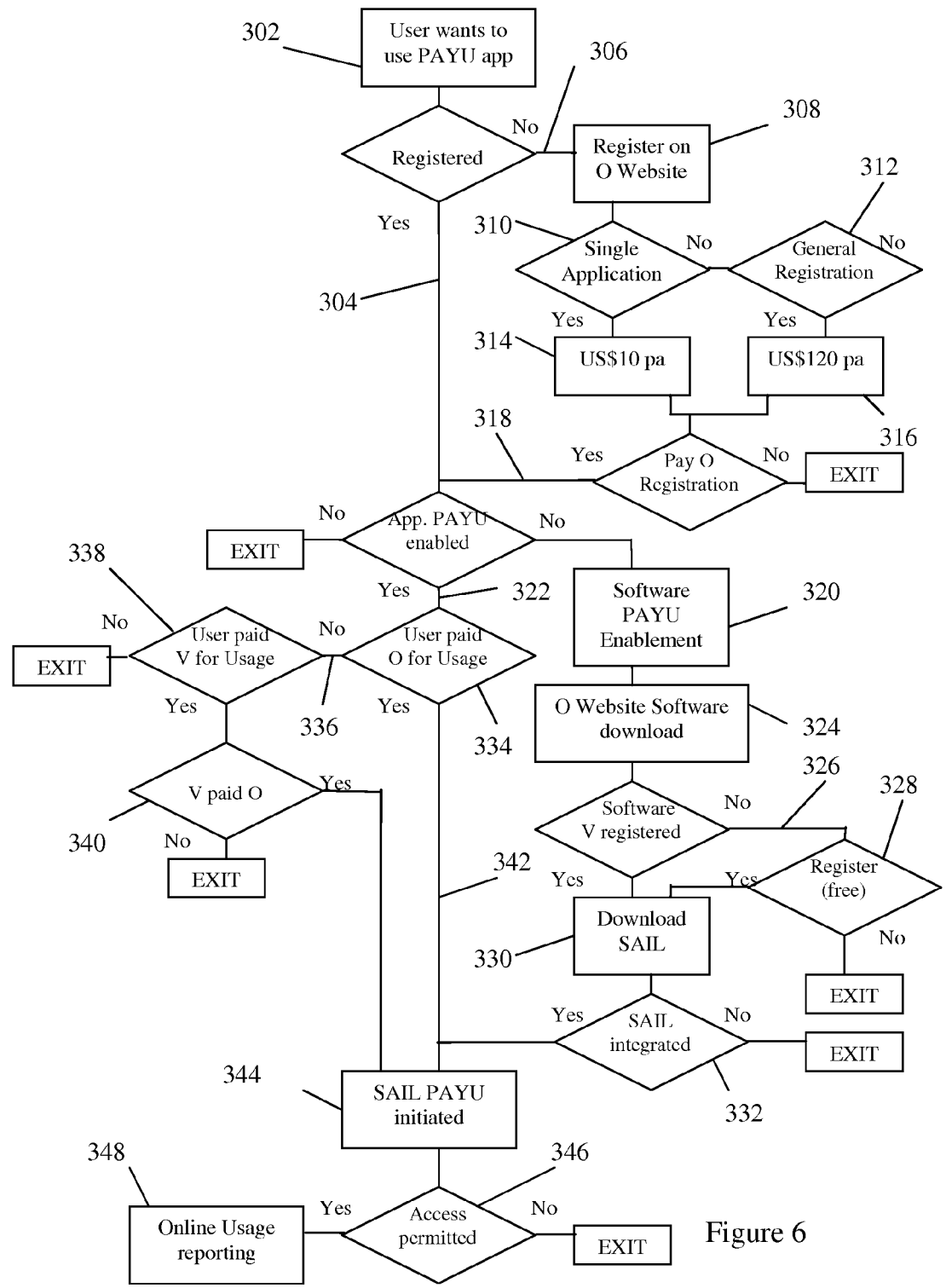
FIG. 6 is a flow chart showing the registration of a user and a software application for use with the present invention.

The SALMON system 22 may be configured to allow many users to be authorised at the same time for one or more software applications. FIG. 6 shows a flow chart setting out the establishment of a pay-as-you-use registration according to the present invention. The flow chart begins at 302 where a user wishes to use a software application utilising the system of the present invention. If the user is registered with the administrators of the authorisation SALMON system 22 they proceed down path 304 otherwise they need to register with the administrator, in this case "OPTIMISER" at 306. An on-line registration site is made available over the Internet at 308, where the user can register to use a single software application 310 or a range of software applications 312. A subscription fee is paid at 314 or 316 depending on whether the user selects a single software application or general use. A rate of, for example US$10 per annum is paid if a single application is to be used. An annual subscription of, for example US$120 per annum is charged for general use of software. Once this payment is made to the administrator the process continues at 318 as if the person was previously registered.

If the user wishes to use an application that is not pay-as-you-use enabled as indicated at 320, the software vendor will need to register the system with the administrators. If the software is registered it will proceed as indicated by 322. The software vendor may download website software as indicated by 324. If the software vendor is not registered with the administrator as indicated by 326 the vendor must register at 328. Once the vendor is registered the SAIL interface program can be downloaded at 330 and integrated into the vendor's software at 332.

Once the user is registered, the user must have credit available with the administrator. This is checked at 334. If they don't, as indicated by 336, they must purchase RTLs. If they have paid the vendor for usage as indicated by 338 the vendor must pass on the usage payment at 340 to the administrator, which will be credited as RTLs. Once the user has RTLs credited as indicated by 342 the user may use the software according to the present invention. When the software application is started the SAIL is activated at 344, as described above, with 344 being equivalent to 50 in FIGS. 4 and 5. The authorisation of the user is indicated by 346 being the equivalent of the OK message 64 in FIGS. 4 and 5. On-line usage reporting, indicated by 348, is equivalent to the recording of the logging in and consumption of RTLs. The user may then view their access usage and RTL consumption at a later stage. Even if the software is not charged for use, the software can be recorded and tracked.

The SAIL interface 16 may provide a "heart beat" function that periodically sends the SALMON system 22 a message to check that a connection between the two still exists. If the connection has dropped out, it may be re-established or the application terminated, depending on the security desired by the software vendor.

A list of SAIL Application Program Interface (API) system calls is listed in appendix 1. A more preferred list of SAIL API system calls is listed in appendix 2. A set of example scenarios showing the use of the SAIL 16 is included in appendix 3.

The SAIL interface as implemented as an Application Programmable Interface (API) library able to interface with the programming language of the software application. Programming methodologies like ActiveX or CORBA can be used to provide class wrappers around the system API library.

Now that the preferred embodiments have been described it will be clear to the skilled addressee that it has at least the following advantages. A locked software application may be provided to each user that is only able to be unlocked and used where the user purchases run time licences which are consumed on a per use or time basis. This means that software does not need to be downloaded and may be provided on, for example, a floppy disk, CD-ROM or DVD ROM. The user only receives use of the software that they pay for and the user only has to pay for the actual use of the software.

It will be clear that modifications and variations can be made to the present invention, such as the implementation need not be exactly as described in the above mentioned example, the computer language that the underlying software is programmed in may be any suitable language, such as Java, C++ or Visual BASIC. The method of charging and/or billing for use of the run time licences for the software may vary from those described above. It is also envisages that the present invention may be applicable to authorise specified users to access a program, rather than for payment of RTLs. Such a security measure to only allow certain personnel to access sensitive software applications and is able to track their use.

Such modifications and variations are intended to be within the scope of the present invention, the nature of which is to be determined from the foregoing description.

The invention claimed is:

1. A method of authorizing use of a computer program with an authorization system, said method comprising:
recording an identifier of a computer program to be authorized for use on the authorization system;
registering a user with the authorization system including sending a user identification to the user from the authorization system, wherein the user is a person seeking use of a computer program;
recording an agreement that relates to the manner of authorized use of the computer program by the user on the authorization system;
receiving at the authorization system a request from the user to use the computer program;
receiving at the authorization system a computer program identifier and a user identification in a login request message;
verifying at the authorization system the identity of the user from the user identification and checking the agreement to determine whether the user identified by the received user identification is authorized to use the computer program identified by the computer program identifier;
recording on the authorization system the information sent with the request message;
indicating to the computer program whether the user is authorized to use the computer program, where if the user is verified and authorized to use the computer program, then an authorization message is sent from the authorization system to the computer program thereby allowing use of the computer program by the user, otherwise an authorization denied message is sent from the authorization system to the computer program thereby disallowing use of the computer program.

2. A method of authorizing use of a computer program using an authorization system and an interface configured to pass messages between the computer program and the authorization system, said method comprising:
recording at the authorization system an identifier of the computer program to be authorized for use;
registering a user on the authorization system including sending a user identification from the authorization system to the user, wherein the user is a person seeking use of a computer program;
recording on the authorization system an agreement that relates to the manner of authorized use of the computer program by the user;
receiving at the authorization system a request from the user to use the computer program, the request activating the interface;
receiving at the authorization system the user identification from the interface in a login request message, the interface having received the user identification from the user;
verifying the identity of the user from the user identification, and if the identity of the user is verified, then sending a login successful message from the authorization system to the interface;
receiving the computer program identifier at the authorization system from the interface in a computer program user request message if a login successful message is received at the computer program by the interface;
recording at the authorization system the information sent in the user request message;
checking the agreement on the authorization system to determine whether the user is authorized to use the computer program identified by the computer program identifier;
sending an authorization message from the authorization system to the interface if the user is authorized to use the computer program, otherwise sending an authorization denied message from the authorization system to the interface; and
allowing use of the computer program by the user upon receipt by the interface of the authorization message.

3. A method according to claim 1, wherein the computer program is a sub-component of the software application.

4. A method according to claim 3, wherein the login request message is sent to the authorization system when the user requests to use the sub-component of the software application.

5. A method according to claim 1, further comprising:
receiving a use message from the computer program indicating that the computer program is being used after use of the computer program is allowed; and
recording the use message against the identified user.

6. A method according to claim 1, further comprising:
receiving a request to incur a charge for the use of the computer program after use of the computer program is allowed.

7. A method according to claim 1, wherein the authorization denied message includes information relating to the reason for denying use of the computer program.

8. A method according to claim 2, wherein if an authorization denied message is sent to the computer program, then the interface determines how to proceed based on information relating to the reason for denying use of the computer program.

9. A method according to claim 1, wherein the agreement permits use of computer program by a class of user.

10. A method according to claim 1, wherein the agreement specifies whether the user is charged for use of the computer program.

11. A method according to claim 10, wherein the charge for use of the computer program is determined by terms of the agreement relating to the manner of authorized use of the computer program by the use.

12. A method according to claim 1, wherein an interface program signals the login request to the authorization system.

13. A method according to claim 6, wherein the charge is recorded in program use units that operate as a currency for payment for use of one or more computer programs.

14. A method according to claim 13, wherein the rate at which program use units are charged for use of the particular program is recorded in the authorization system.

15. A method according to claim 14, wherein the program use units are charged by the authorization system upon receipt of the request to charge for use at the recorded rate.

16. A method according to claim 6, wherein the request to the authorization system to charge the user is sent once per use of the computer program.

17. A method according to claim 6, wherein the request to the authorization system to charge the user is sent once per specified period during the use of the computer program.

18. A method according to claim 12, wherein the communication between the interface program and the authorization system is encrypted.

19. A method according to claim 18, wherein messages sent between the interface program and the authorization system includes a unique component that is only valid for a single use.

20. A method according to claim 1, wherein the user identification is obtained from the user by providing the user with a login prompt, the user entering the login identification provided by the authorization system and the entered user identification being included in the login request.

21. A method according to claim 12, wherein the interface program is a separate program called by the computer program being authorized as part of the initialisation of the computer program.

22. A method according to claim 12, wherein the interface program forms part of the computer program and is started when a user attempts to use the computer program.

23. A method according to claim 12, wherein the interface program is part of an operating system and is started when a user attempts to use the computer program.

24. A method according to claim 12, wherein the authorization system is at a location remote from a computer running the activated computer program.

25. A method according to claim 24, wherein the computer running the activated computer program also runs the interface program, the interface program communicates with the authorization system over a computer network.

26. A method according to claim 1, wherein the authorization system is configured to authorize and record use of a plurality of computer programs.

27. A method according to claim 1, wherein the authorization system is configured to authorize and record use of a plurality of users of the same computer program.

28. A method according to claim 1, wherein the authorization of use of the computer program ends when the computer program is terminated.

29. A method according to claim 1, wherein a message is periodically received by the authorization system, and a reply is sent from the authorization system, whereby the reply is constructed so that if a reply is not received, authorization of use of the computer program ends.

30. A distributed system for authorizing use of a computer program, said system comprising:
an authorization system, the authorization system including a storage device for recording an identifier of a computer program to be authorized for use, a user identification and an agreement that relates to the authorized use of the computer program by a user, wherein the user is a person seeking use of a computer program; and
a computer for running the computer program; the computer being configured to send the identifier of the computer program and the user identification to the authorization system in a login request message when the user makes a request to use the computer program;
the authorization system being configured to verify the identity of the user from the recorded user identification and to check the agreement to determine whether the user is authorized to use the computer program identified by the computer program identifier;
the authorization system being configured to record the information sent with the login request message;
the authorization system being configured to send an authorization message to the computer if the user is verified and authorized to use the computer program and otherwise to send an authorization denied message to the computer; and
the computer being configured to continue use of the computer program upon receipt of the authorization message but otherwise to terminate the use of the computer program.

31. A system according to claim 30, wherein the computer is configured to send a request to the authorization system to record a charge or the use of the computer program against the identified user for use of the computer program.

32. A system according to claim 31, wherein the authorization system is configured to record the rate of charge for the use of the computer program.

33. A system according to claim 30, wherein the authorization system is configured to record a charge against the user upon receipt of the request to charge for use of the computer program.

34. A system according to claim 33, wherein the computer is configured to send a request to the authorization system to charge the user once per use of the computer program.

35. A system according to claim 33, wherein the computer is configured to send a request to the authorization system to charge the user is sent once per specified period during the use of the computer program.

36. A system according to claim 30, wherein the communication between the computer program and the authorization system is encrypted.

37. A system according to claim 30, wherein the computer and the authorization system are configured to include a unique component in the encrypted messages communicated therebetween.

38. A system according to claim 30, wherein the authorization system is at a location remote from a computer running the activated computer program.

39. A system according to claim 30, wherein the computer running the activated computer program also runs an interface program, that configures the computer to send the login request message to the authorization system and also configures the computer to receive the authorization message from the authorization system and to allow continued use of the computer program upon receipt of the authorization message.

40. A system according to claim 30, wherein the authorization system is configured to authorize and record use of a plurality of computer programs.

41. A system according to claim 30, wherein the authorization system is configured to end the authorized use of the computer program when the computer program is terminated.

42. A system according to claim 30, wherein the computer is configured to periodically send a message to the authorization system, and to receive a reply sent from the authorization system, whereby if a reply is not received, then the computer is configured to end authorized use of the computer program.

43. A method according to claim 2, wherein the computer program is a software application.

44. A method according to claim 6, further comprising recording a charge against the identified user for the use of the computer program.

45. A method according to claim 44, wherein the agreement specifies whether the user is permitted to use the subcomponent of the software application.

46. A method as claimed in claim 1, wherein communication between the authorization system and a computer loaded with the computer program to be authorized, occurs between geographically separated locations over a global communication network.

47. A method as claimed in claim 1, wherein the login request message is sent from a remote site to the authorization system.

48. A method as claimed in claim 1, wherein the method further comprises:
    registering a second distinct user including sending a second user identification to the second user;
    recording a second agreement that relates to the manner of authorized use of the computer program by the second user;
    receiving a second request for the second user to use the computer program in a second request message;
    receiving a computer program identifier and a second user identification in a second login request message;
    verifying the identity of the second user from the second user identification and checking the second agreement to determine whether the second user is authorized to use the computer program identified by the computer program identifier;
    recording information sent in the second request message;
    indicating to the computer program whether the second user is authorized to use the computer program, where if the second user is verified and authorized to use the computer program, then an authorization message is sent to the computer program thereby allowing use of the computer program by the second user, otherwise an authorization denied message is sent to the computer program.

49. An authorization system for authorizing use of a computer program, the authorization system comprising:
    a storage of agreements, each agreement comprising data representing a manner of authorized use of a computer program by a user, wherein the user is a person seeking use of a computer program;
    a server configured to lookupage and retrieve agreements, wherein each agreement retrieved is based on a received computer program identifier and a received user identifier;
    an interface module associated with an installation of a computer program which is activated upon a user seeking to use at least part of the installation of the computer program, the interface module being configured to login a user for identifying the user, and send a user identifier and an identifier of the associated computer program to the server, the interface module being further configured to allow use of the installation of the computer program by the user according to the details in a received authorization message; and
    an authorization module configured to access the retrieved agreement to determine whether the identified user is permitted to use the at least part of the computer program and in the event that the user is permitted the authorization module is configured to send an authorization message to the interface module, the authorization message comprising details of the manner of use authorized according to the retrieved agreement.

50. A method of authorizing use of a computer program, the method comprising:
    storing a plurality of agreements, each agreement comprising data representing a manner of authorized use of a computer program by a user, wherein the user is a person seeking use of a computer program;
    activating an interface module associated with an installation of a computer program when a user seeks to use at least a part of the installation of the computer program;
    identifying a user using a login;
    sending a user identifier and an identifier of the computer program to a server;
    looking-upage and retrieving by the server one of the agreements based on the received identifier of the computer program and the received user identifier;
    accessing the retrieved agreement to determine whether the identified user is permitted to use at least part of the computer program, and in the event that the user is permitted, sending an authorization message to the interface module, the authorization message comprising details of the manner of use authorized according to the retrieved agreement; and
    allowing use of the installation of the computer program by the user according to the details in the authorization message.

51. A method of authorizing use of a computer program, with an authorization system, said method comprising:
    recording on the authorization system an identifier of each of a plurality of computer programs to be authorized for use;
    registering a plurality of users with the authorization system including sending a respective user identification to each user from the authorization system, wherein each user is a person seeking to use a computer program;
    recording on the authorization system an agreement that relates to the manner of permitted use of one or more of the computer programs for each user and a rate at which each user is charged for use of the one or more computer programs, wherein the agreement covers whether the requesting user is permitted to use one or more subcomponents of the one or more computer programs;
    receiving at the authorization system a request for one of the users to use an instance of one of the computer programs;
    receiving at the authorization system a computer program identifier corresponding to the requested computer program and a respective user identification provided by the requesting user in a login request message;
    verifying at the authorization system the identity of the requesting user from the received user identification and checking the respective agreement to determine whether the requesting user is permitted to use the requested computer program identified by the received computer program identifier;
    recording on the authorization system information sent with the request;
    indicating to the instance of the requested computer program whether the requesting user is permitted to use the requested computer program by sending either an authorization message or an authorization denied message, where if the requesting user is verified and permitted to use the requested computer program, an authorization message is sent from the authorization system to the instance of the requested computer program, otherwise an authorization denied message is sent from the authorization system to the instance of the requested computer program, wherein the authorization message is configured to allow use of one or more of the permitted sub-components of the instance of the requested computer program according to the agreement for the use of the requested computer program by the requesting user;

receiving one or more requests to incur a charge for use of the requested computer program after use of the instance of the requested computer program is allowed;

recording a charge on the authorization system for use of the requested computer program upon receipt of the or each request to incur a charge, wherein the charge is recorded according to the rate in the agreement for use of the requested computer program by the requesting user;

receiving a message periodically sent to the authorization system by the authorized instance of the requested computer program; and sending a reply from the authorization system to the authorized instance of the requested computer program, wherein the reply is configured such that if the reply is not received, authorization of use of the instance of the requested computer program ends, wherein each periodic message sent between the instance of the requested computer program and the authorization system includes a unique component that is only valid for a single use.

52. A method according to claim 1, further comprising:
receiving a periodic request to incur a charge for use of the computer program for each time period in which the computer program is in use after use of the computer program is allowed.

53. A method according to claim 10, wherein the agreement specifies free use of the computer program in some circumstances and paid use of the computer program in other circumstances.

54. A method according to claim 45, wherein the agreement specifies free use of some sub-components of the computer program and paid use of other sub-components of the computer program.

55. A method according to claim 1, wherein the method further comprises charging the user for use of the computer program.

56. A method according to claim 55, wherein the user is charged for use of the computer program on a time basis.

57. A method according to claim 56, wherein the charging on a time basis comprises incurring a charge for use of the computer program according to the period of use of the computer program.

58. A method according to claim 56, wherein the charging on a time basis comprises incurring a charge for use of the computer program after each of a period of time passes over which the computer program is in use.

59. A method according to claim 58, wherein the method further comprises consuming use credits for each period of time in which the computer program is used, such that the user is charged or billed for the period of use of the computer program.

60. A method according to claim 59, wherein the use credits are prepaid use credits.

61. A method according to claim 56, wherein the charging on a time basis comprises receiving a subscription fee for use of the computer program during a period of time.

62. A method according to claim 1, wherein checking the agreement to determine whether the user identified by the received user identification is authorized to use the computer program identified by the computer program identifier comprises checking to determined whether the user had paid for use of the computer program during a time period in which the user seeks to use the computer program.

63. A method according to claim 6, wherein the method further comprises sending a confirmation that a charge has been incurred to the computer on which the computer program is authorized to be used in response to the request to incur a charge for use of the computer program.

64. A method according to claim 1, wherein the user's account creditability is validated by checking whether sufficient credit is available in the user's account.

65. A method according to claim 55, wherein the method further comprises recording a price for use of the computer program and a frequency of required payment of the price in the authorization system.

66. A method according to claim 55, wherein the method further comprises recording a price for use of the computer program in the authorization system, wherein the price is a one-off charge for use of the computer program.

67. A method according to claim 55, wherein the method further comprises receiving from a software vendor the price for use of the computer program.

68. A method according to claim 1, wherein the user identification comprises one or both of an account user name and a password.

69. A method according to claim 1, wherein the user identification is personal to the user irrespective of a computer on which the computer program is sought to be used.

70. A method according to claim 1, wherein registration of the user comprises creating an account with a provider of the computer program.

71. A method according to claim 1, wherein the method further comprises providing a computer with a locked computer program that is able to be unlocked for use when the computer program receives the authorization message.

72. A method according to claim 1, wherein the authorization system runs on a server device connected to a network which enables communication between the authorization system and a computer on which the computer program is sought to be used.

73. A method according to claim 29, wherein the message periodically received by the authorization system is a communication confirmation message sent by the user computer after the user is authorized to use the computer program.

74. A method according to claim 1, wherein verifying the identity of the user from the user identification comprises determining whether the user identification recorded in a memory device of the authorization system matches the user identification received in the login request message.

75. A method according to claim 1, wherein checking the agreement recorded to determine whether the user is authorized to use the computer program identified by the computer program identifier comprises determining whether the computer program identifier received in the login request message matches the recorded identifier of a computer program and checking the agreement to determine whether the user is authorized to use the computer program identified by the computer program identifier received in the login request message.

76. A method according to claim 1, further comprising receiving a second login request message from a different computer that sent the first mentioned login request message, the second login request message comprising a computer program identifier of a second installation of the same computer program and a user identification from the same user.

77. A method according to claim 76, further comprising
verifying at the authorization system the identity of the user from the user identification receiving in the second login request and checking the agreement to determine whether the user is authorized to use the computer program identified by the computer program identifier of the second login request; and indicating to the computer program installed on the second computer whether the user is authorized to use the computer program, where if the user is verified and authorized to use the computer program, then an authorization message is sent from the authorization system to the computer program thereby allowing use of the computer program by the user, otherwise an authorization denied message is sent from the authorization system to the computer program thereby disallowing use of the computer program.

78. A method according to claim 1, wherein the computer program comprises a game.

79. A method according to claim 10, wherein the charge for use of the computer program is a single charge for an unlimited use of the computer program.

80. A method of seeking authorization of a computer program to be run on a user's computer by an authorization system, said method comprising recording an identifier of a computer program to be authorized for use on the user's computer;

receiving user identification from the authorization system, wherein the user is a person seeking use of the computer program;

sending to the authorization system an indication of an agreement by the user to an agreement that relates to the manner of authorized use of the computer program by the user;

sending a request from to use the computer program from the user's computer to the authorization system;

sending the recorded computer program identifier and a user identification in a login request message from the user's computer to the authorization system so that the authorization system is able to verify the identity of the user from the send user identification and so that the authorization system is able to check the agreement agreed to determine whether the user identified by the received user identification is authorized to use the computer program identified by the computer program identifier; and receiving at the user's computer an indication sent from the authorization system to the computer program whether the user is authorized to use the computer program, where if the user is verified and authorized to use the computer program, then the computer program is allowed to proceed, but otherwise use of the computer program is denied.

81. A method according to claim 80, further comprising:
sending a use message from the computer program indicating that the computer program is being used after use of the computer program is allowed.

82. A method according to claim 80, further comprising:
sending a request to incur a charge for the use of the computer program after use of the computer program is allowed.

83. A method according to claim 80, further comprising:
sending a periodic request to incur a charge for use of the computer program for of a period of time that passes in which the computer program is in use after use of the computer program is allowed.

84. A method according to claim 80, further comprising sending a subscription fee for use of the computer program during a period of time to the authorization system.

85. A method according to claim 80, wherein the method further comprises receiving a confirmation that a charge has been incurred to the computer on which the computer program is authorized to be used in response to a request to incur a charge for use of the computer program.

86. A method according to claim 80, wherein an interface program signals the login request to the authorization system.

87. A method according to claim 86, wherein if an authorization denied message is sent to the computer program, then the interface determines how to proceed based on information relating to the reason for denying use of the computer program.

88. A method according to claim 86, wherein the interface program is a separate program called by the computer program being authorized as part of the initialization of the computer program.

89. A method according to claim 86, wherein the interface program forms part of the computer program and is started when a user attempts to use the computer program.

90. A method according to claim 86, wherein the interface program is part of an operating system and is started when a user attempts to use the computer program.

91. A method according to claim 80, wherein the computer running the activated computer program also runs the interface program, the interface program communicates with the authorization system over a computer network.

92. A method according to claim 80, wherein the authorization of use of the computer program ends when the computer program is terminated.

93. A method according to claim 80, wherein a message is periodically sent to the authorization system, and a valid reply is expected to be received from the authorization system, whereby if a valid reply is not received, authorization of use of the computer program ends.

94. A method according to claim 80, wherein the user identification is personal to the user irrespective of a computer on which the computer program is sought to be used.

95. A method according to claim 80, wherein the method further comprises receiving a locked computer program that is able to be unlocked for use when the computer program receives the authorization message.

96. A method according to claim 80, wherein the message periodically sent to the authorization system is a communication confirmation message sent by the user computer after the user is authorized to use the computer program.

97. A method according to claim 80, wherein the method further comprises sending information to a registration system necessary to register the user with the authorization system.

98. A method according to claim 80, wherein information necessary to register the user comprises the indication that the user agrees to the agreement that relates to the manner of authorized use of the computer program.

99. A method according to claim 80, wherein the method further comprises sending a request to incur a charge for use of the computer program.

100. A method according to claim 80, wherein the method further comprises sending a periodic request to incur a charge for use of the computer program for each time period in which the computer program is in use.

101. A method according to claim 80, wherein the method comprises activating the computer program for use and the computer program calling a login sub-routine for receiving login information from the user and for sending the login information to the authorization system in the request to use the computer program.

102. A method according to claim 80, wherein the method comprises activating the computer program for use and the computer program calling a login sub-routine for retrieving previously provided login information identifying the user and for sending the login information to the authorization system in the request to use the computer program.

103. A method according to claim 80, wherein the method further comprises waiting for the login sub-routine to return a message indicating that the user is logged in, wherein the user is logged in when the login sub-routine received the authorization message.

104. A method of authorizing use of a computer program, said method comprising:
   recording an identifier of a computer program to be authorized for use on the authorization system;
   recording the identifier of a computer program to be authorized for use on the user's computer;
   registering a user with the authorization system including sending a user identification to the user from the authorization system, wherein the user is a person seeking use of a computer program;
   receiving user identification from the authorization system;
   recording an agreement that relates to the manner of authorized use of the computer program by the user on the authorization system;
   sending to the authorization system an indication of an agreement by the user to the agreement that relates to the manner of authorized use of the computer program by the user;
   sending a request from to use the computer program from the user's computer to the authorization system;
   receiving at the authorization system the request from the user to use the computer program;
   sending the recorded computer program identifier and a user identification in a login request message from the user's computer to the authorization system
   receiving at the authorization system a computer program identifier and the user identification in the login request message;
   verifying at the authorization system the identity of the user from the user identification and checking the agreement to determine whether the user identified by the received user identification is authorized to use the computer program identified by the computer program identifier;
   recording on the authorization system the information sent with the request message;
   indicating to the computer program whether the user is authorized to use the computer program, where if the user is verified and authorized to use the computer program, then an authorization message is sent from the authorization system to the computer program, otherwise an authorization denied message is sent from the authorization system to the computer program; and
   receiving at the user's computer a message sent from the authorization system to the computer program whether the user is authorized to use the computer program, where if an authorization message is received then the computer program is allowed to proceed, but otherwise use of the computer program is denied.

105. An authorization system for authorizing a user to use a computer program on a computer, said system comprising:
   a memory for recording an identifier of a computer program to be authorized for use on the authorization system and for recording an agreement that relates to the manner of authorized use of the computer program by the user on the authorization system;
   a registration module for registering a user with the authorization system including sending a user identification to the user from the authorization system, wherein the user is a person seeking use of a computer program, where in the user identification is recorded in the memory;
   a receiver for receiving a request from the user to use the computer program and for receiving a computer program identifier and a user identification in a login request message;
   a processor configured to verify the identity of the user from the user identification and checking the agreement to determine whether the user identified by the received user identification is authorized to use the computer program identified by the computer program identifier; and
   a transmitter for indicating to the computer program whether the user is authorized to use the computer program, where if the user is verified and authorized to use the computer program, then an authorization message is sent from the authorization system to the computer program thereby allowing use of the computer program by the user, otherwise an authorization denied message is sent from the authorization system to the computer program thereby disallowing use of the computer program.

106. A system according to claim 105, wherein the receiver is also for receiving a use message from the computer program indicating that the computer program is being used after use of the computer program is allowed; and, wherein the memory is also for recording the use message against the identified user.

107. A system according to claim 105, wherein the receiver is also for receiving a request to incur a charge for the use of the computer program after use of the computer program is allowed.

108. A system according to claim 107, wherein the processor is also configured to charge the user for use of the computer program according to terms of the agreement relating to the manner of authorized use of the computer program by the user.

109. A system according to claim 108, wherein the memory is also for recording a charge against the identified user for the use of the computer program.

110. A system according to claim 108, wherein the processor is also configured to charge on a time basis comprising recording a charge in the memory for use of the computer program according to the period of use of the computer program.

111. A system according to claim 108, wherein the processor is also configured to charge on a time basis comprises recording a charge in the memory for use of the computer program after each of a period of time passes over which the computer program is in use.

112. A system according to claim 108, wherein the processor is also configured to consume use credits for each period of time in which the computer program is used, such that the user is charged or billed for the period of use of the computer program.

113. A system according to claim 108, the transmitter is also for sending a confirmation that a charge has been incurred to the computer on which the computer program is authorized to be used in response to the request to incur a charge for use of the computer program.

114. A system according to claim 105, wherein the receiver is also for receiving a periodic communication message and the transmitter is also for sending a reply to the communication message, whereby the reply is constructed so that if a reply is not received, authorization of use of the computer program ends.

115. A system according to claim 105, wherein the registration module is also for registering a second distinct user including sending a second user identification to the second user; the memory is also for recording a second agreement that relates to the manner of authorized use of the computer program by the second user; the receiver is also for receiving a second request for the second user to use the computer program in a second request message, and receiving a computer program identifier and a second user identification in a second login request message; the processor is also configured to verify the identity of the second user from the second user identification and checking the second agreement to determine whether the second user is authorized to use the computer program identified by the computer program identifier; the transmitter is also for sending an indication to the computer program whether the second user is authorized to use the computer program, where if the second user is verified and authorized to use the computer program, then an authorization message is sent to the computer program thereby allowing use of the computer program by the second user, otherwise an authorization denied message is sent to the computer program.

116. A system according to claim 105, wherein the registration module is also for creating an account with a provider of the computer program.

117. A system according to claim 105, wherein the processor is also configured to verify the identity of the user from the user identification by determining whether the user identification recorded in the memory matches the user identification received in the login request message.

118. A system according to claim 105, wherein the processor is also configured to determine whether the computer program identifier received in the login request message matches the recorded identifier of a computer program and check the agreement to determine whether the user is authorized to use the computer program identified by the computer program identifier received in the login request message.

119. A system according to claim 105, wherein the receiver is also for receiving a second login request message from a different computer that sent the first mentioned login request message, the second login request message comprising a computer program identifier of a second installation of the same computer program and a user identification from the same user.

120. A computer configured in a manner that seeks authorization from an authorization system for use of a computer program to be run on the computer, said computer comprising;
a memory for recording an identifier of a computer program to be authorized for use on the user's computer;
a receiver for receiving user identification from the authorization system, wherein the user is a person seeking use of the computer program; and
a transmitter for:
sending to the authorization system an indication of an agreement by the user to an agreement that relates to the manner of authorized use of the computer program by the user;
sending a request from to use the computer program from the user's computer to the authorization system; and
sending the recorded computer program identifier and a user identification in a login request message from the user's computer to the authorization system so that the authorization system is able to verify the identity of the user from the send user identification and so that the authorization system is able to check the agreement agreed to determine whether the user identified by the received user identification is authorized to use the computer program identified by the computer program identifier;
the receiver also for receiving at the user's computer an indication sent from the authorization system to the computer program whether the user is authorized to use the computer program, where if the user is verified and authorized to use the computer program, then the computer program is allowed to proceed, but otherwise use of the computer program is denied.

121. A computer program product comprising instructions stored on a non-transitory computer readable storage tangible medium that when executed control a computer to operate as an authorization system which is configured to
record an identifier of a computer program to be authorized for use on the authorization system;
register a user with the authorization system including sending a user identification to the user from the authorization system, wherein the user is a person seeking use of a computer program;
record an agreement that relates to the manner of authorized use of the computer program by the user on the authorization system;
receive at the authorization system a request from the user to use the computer program;
receive at the authorization system a computer program identifier and a user identification in a login request message;
verify at the authorization system the identity of the user from the user identification and checking the agreement to determine whether the user identified by the received user identification is authorized to use the computer program identified by the computer program identifier; and
record on the authorization system the information sent with the request message; indicate to the computer program whether the user is authorized to use the computer program, where if the user is verified and authorized to use the computer program, then an authorization message is sent from the authorization system to the computer program thereby allowing use of the computer program by the user, otherwise an authorization denied message is sent from the authorization system to the computer program thereby disallowing use of the computer program.

122. A computer program product comprising instructions stored on a non-transitory computer readable storage tangible medium that when executed control a computer to operate the computer to seek authorization from an authorization system for use of a computer program to be run on the computer, the computer being configured to
record an identifier of a computer program to be authorized for use on the user's computer;
receive user identification from the authorization system, wherein the user is a person seeking use of the computer program;
send to the authorization system an indication of an agreement by the user to an agreement that relates to the manner of authorized use of the computer program by the user;
send a request from to use the computer program from the user's computer to the authorization system; and send the recorded computer program identifier and a user identification in a login request message from the user's computer to the authorization system so that the authorization system is able to verify the identity of the user from the send user identification and so that the authorization system is able to check the agreement agreed to determine whether the user identified by the received user identification is authorized to use the computer program identified by the computer program identifier; and receive at the user's computer an indication sent from the authorization system to the computer program whether the user is authorized to use the computer program, where if the user is verified and authorized to use the computer program, then the computer program is allowed to proceed, but otherwise use of the computer program is denied.

\* \* \* \* \*

UNITED STATES PATENT AND TRADEMARK OFFICE
CERTIFICATE OF CORRECTION

PATENT NO. : 8,365,303 B2  
APPLICATION NO. : 12/730679  
DATED : January 29, 2013  
INVENTOR(S) : Leo Joseph Mullins It is certified that error appears in the above-identified patent and that said Letters Patent is hereby corrected as shown below:

In the Claims

Col. 3, line 51, claim 49: "lookupage" should read --lookup--

Col. 14, line 18, claim 50: "looking-upage" should read --looking-up--

Signed and Sealed this  
Thirtieth Day of December, 2014

Michelle K. Lee  
*Deputy Director of the United States Patent and Trademark Office*